Sept. 10, 1929.    R. R. RIFE    1,727,618
MICROSCOPE LAMP
Filed Aug. 2, 1927
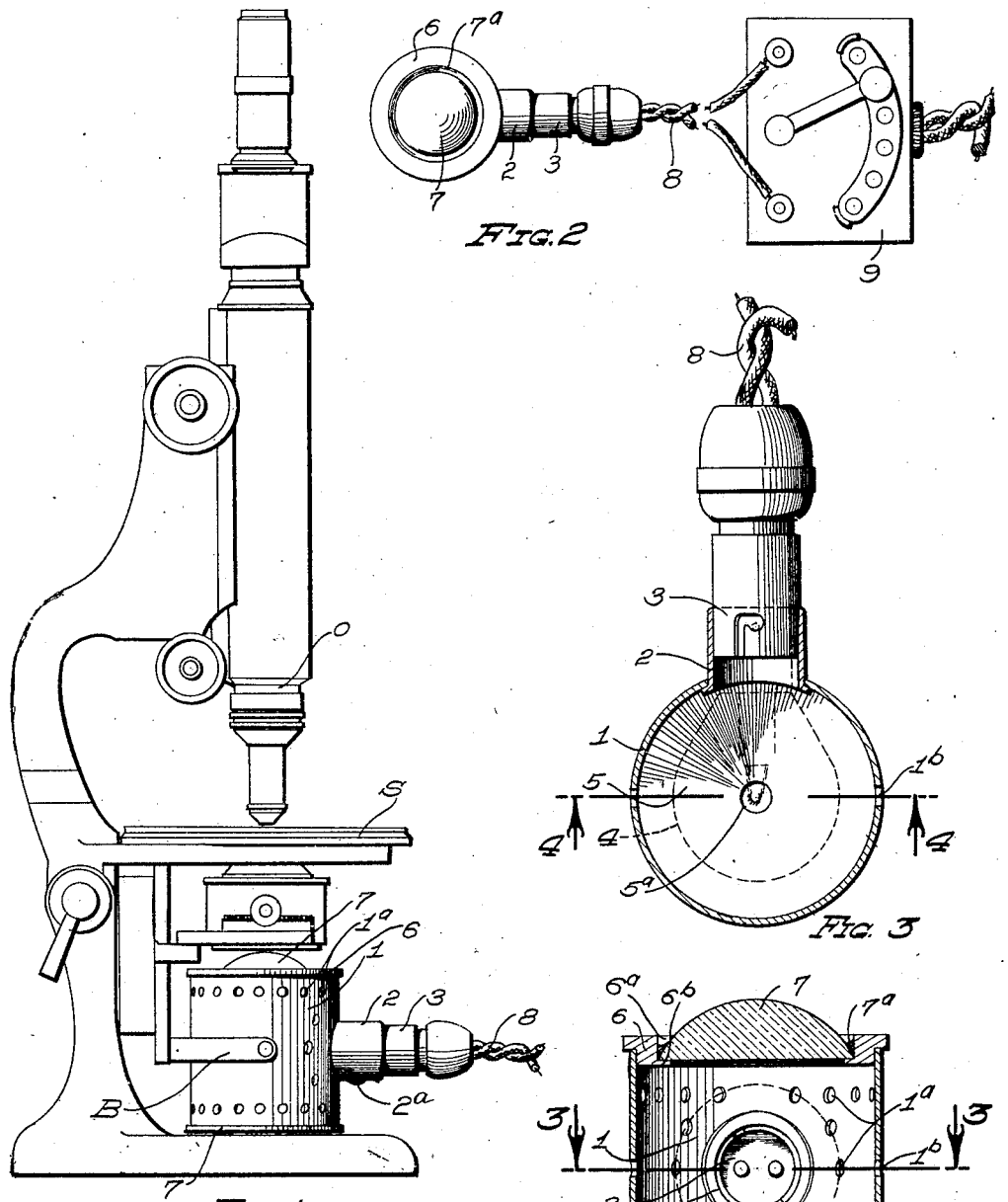
INVENTOR.
Roy R. Rife
BY A. C. Bonman
ATTORNEY Patented Sept. 10, 1929.

1,727,618

UNITED STATES PATENT OFFICE.

ROY R. RIFE, OF SAN DIEGO, CALIFORNIA.

MICROSCOPE LAMP.

Application filed August 2, 1927. Serial No. 210,099.

My invention relates to microscope lamps and the objects of my invention are: first, to provide a lamp of this class which is positiond directly below the stage of the microscope; second, to provide a device of this class which fits into the mirror yoke of the microscope; third, to provide a device of this class in which the intensity of light may be easily controlled; fourth, to provide a device of this class in which the lamp is of ample intensity for the most minute or microscopic studies; fifth, to provide a device of this class which is attached to the microscope and is not an accessory thereto; sixth, to provide a device of this class which provides superior quality of flat and uniform light which is excellent for microscopic and microphotographic work; seventh, to provide a device of this class which is well ventilated to prevent excessive heat; eighth, to provide a device of this class in which the light emitted therefrom does not fluctuate and therefore reduces to a minimum the strain on the operator's eyes; and ninth, to provide a device of this class which is simple of construction, easy to install on any conventional microscope, neat in appearance, durable, efficient in its action, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a side elevational view of my microscope lamp shown in connection with a conventional microscope; Fig. 2 is a top or plan view of my microscope lamp shown in connection with a rheostat means for varying the intensity of the light of the lamp; Fig. 3 is an enlarged sectional view of my microscope lamp through 3—3 of Fig. 4, with certain parts shown in plan to facilitate the illustration, and with the light bulb therein shown by dotted lines, and Fig. 4 is a sectional elevational view thereof through 4—4 of Fig. 3 with the light bulb therein shown by dotted lines.

Similar characters of reference refer to similar parts and portions throughout the several views of the drawings.

The lamp housing 1, lamp socket support 2, lamp socket 3, incandescent lamp 4, reflector 5, lens support 6, lens 7, cord 8, and the rheostat 9, constitute the principal parts and portions of my microscope lamp.

My lamp is positioned below the stage S and at the side thereof opposite the objective O, and is mounted in its preferred form, on the conventional mirror yoke B of the microscope, in place of the usual mirror as will be described later.

The housing 1, is cylindrical, is open at its ends and is provided with a plurality of perforations $1^a$ in the walls thereof. Extending from an opening in the side wall of the housing 1, is a lamp socket support 2. Its inner end is flanged and is soldered or otherwise secured to the housing 1. The support 2, is provided with a clip means $2^a$ for frictionally engaging the lamp socket 3 which is positioned therein. The lamp socket 3, is similar to the conventional automobile lamp socket and may be adjustably positioned in the lamp socket support 2. An incandescent lamp 4 is removably secured in the lamp socket 3. Positioned over the lower open end of the housing 4, is a reflector 5, which is preferably metallic and which is provided with a reflecting surface on its upper side. An opening $5^a$ is provided in the reflector 5, which is centered therein and which, with the perforations $1^a$ in the housing 1, permits thorough circulation of air around the lamp 4. The hole $5^a$, also permits the light emitting portion of the lamp 4 to be more easily centered on the axial line of the microscope lamp. Positioned over the upper open end of the housing 1, is a lens support 6, which is provided with a large central opening $6^a$, therein. The lower edge of the opening $6^a$, has an inwardly extending flange $6^b$, on which rests the lens 7. The lens 7 is planoconvex and is frosted on its plane and inner side. The lens 7, is held in position by means of plastic material 7ª.

The cord 8, which furnishes electricity to the incandescent lamp 4, is connected with the rheostat 9, which varies the strength of current and thereby regulates the intensity of the light of the lamp 4. As shown in Fig. 1 of the drawings the microscope lamp is mounted under the stage of the microscope in place of the microscope mirror. For this purpose, the housing 1, is provided with two oppositely disposed openings in the side walls thereof in which extend projections of the mirror yoke B.

It is obvious from the construction as illustrated in the drawings and included in the foregoing specification, that there is provided a microscope lamp as aimed at and set forth in the objects of my invention, and although I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a microscope lamp of the class described, the combination with a microscope having a stationary base and a pivotal objective, of a cylindrical housing pivotally mounted between said base and said objective in connection with and in alignment with said objective and movable therewith, a lens positioned over the one end of said housing, a reflector positioned over the other end of said housing, and an incandescent lamp extending into said housing from the side thereof at a right angle to its axis between said lens and said reflector.

2. In a microscope lamp of the class described, the combination with a microscope having a stationary base and a pivotal objective, of a cylindrical housing pivotally mounted between said base and said objective in connection with and in alignment with said objective and movable therewith, a lens positioned over the one end of said housing, a reflector positioned over the other end of said housing, an incandescent lamp extending into said housing from the side thereof at a right angle to its normally vertical axis, and means to facilitate the positioning of the light emitting portion of said lamp on the axial line of said housing.

3. In a means of the class described, the combination with a microscope having a stage and an objective at one side thereof, of a support carried by and shiftable with said stage, and a lamp mounted on said support and shiftable therewith opposite the objective.

4. In a means of the class described, the combination with a microscope having a stage, an objective mounted at one side thereof, and a conventional mirror support at the opposite side of said stage, of a lamp, mounted on said support and directed toward said stage.

In testimony whereof, I have hereunto set my hand at San Diego, California, this 16th day of July, 1927.

ROY R. RIFE.